United States Patent Office 3,576,869
Patented Apr. 27, 1971

3,576,869
SALICYLIC ACID o-HYDROXYPHENYLAMIDES
Max Schellenbaum, Muttenz, and Max Duennenberger, Frenkendorf, Switzerland, assignors to Ciba Limited, Basel, Switzerland
No Drawing. Filed July 16, 1968, Ser. No. 745,100
Claims priority, application Switzerland, July 26, 1967, 10,607/67
Int. Cl. C07c *103/30*
U.S. Cl. 260—559    6 Claims

ABSTRACT OF THE DISCLOSURE

This invention provides new salicylic o-hydroxyphenylamides of the general formula

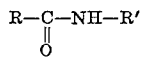

wherein R and R' each represent a phenyl group with an ortho hydroxy group. R may be further substituted in 3 and 5 position by chlorine or bromine and R' is further substituted in 4' or 5' position by trifluoromethyl alkyl, cycloalkyl, aryl and aralkyl residues.

---

These salicylic acid o-hydroxyphenylamides are useful as agents for combatting harmful microorganisms.

The subject of the invention are new salicylic acid o-hydroxyphenylamides of formula (1)

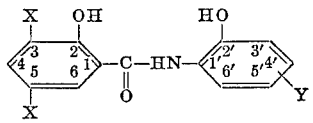

wherein X denotes a hydrogen atom or a halogen atom and Y denotes a trifluoromethyl group, an alkyl group having at most 12 carbon atoms, a cycloalkyl residue, a phenyl residue or an aralkyl residue, with an alkyl group Y containing at least 8 carbon atoms if X represents hydrogen.

These salicylic acid o-hydroxyphenylamides of Formula 1—[subsequently partly also simply called salicylamides] thus correspond to one of the formulae (2)

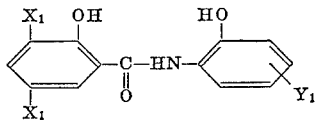

and
(3)

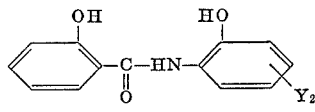

Here $X_1$ denotes a halogen atom, preferably a chlorine or bromine atom, $Y_1$ denotes a trifluoromethyl group, an alkyl group having at most 12 carbon atoms, a cycloalkyl residue, a phenyl residue or an aralkyl residue and $Y_2$ denotes a trifluoromethyl group, an alkyl group having 8 to 12 carbon atoms, a cycloalkyl residue, a phenyl residue or an aralkyl residue. The substituent Y, or $Y_1$ or $Y_2$, is for example in the p-position to the —HN— group and preferably in the p-position to the HO— group:

(4)

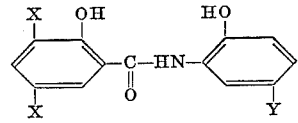

If Y is an alkyl group, then the latter may be unbranched or branched. n-Octyl, n-dodecyl and 1,1,3,3-tetramethyl-butyl groups, and in the case where the salicylic acid residue contains 2 halogen atoms, methyl, ethyl, n-propyl, isopropyl and tertiary butyl groups, may be mentioned as examples. Possible cycloalkyl residues are primarily cyclohexyl residues and possible aralkyl residues for example benzyl residues or especially 1,1-dimethyl-1-phenyl-methyl residues (cumyl residues).

The new salicylamides of Formula 1 may appropriately be manufactured by condensation of salicylic acid halides of formula (5)

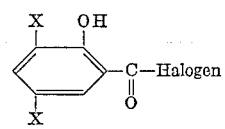

especially salicylic acid chloride of the chlorides of 3,5 dibromosalicylic acid or of 3,5-dichlorosalicylic acid with o-hydroxyaminobenzenes of formula (6)

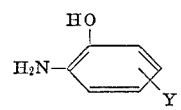

wherein X and Y have the significance mentioned. It is advantageous to work in an inert organic solvent and with the addition of an acid-binding reagent, for example of aqueous sodium hydroxide solution.

The salicylamides of Formulae 1 to 3 can be used for combatting harmful micro-organisms and using the salicyl-amides, materials for combatting harmful micro-organisms can be manufactured and used in the usual manner which is in itself known. A particularly valauble aspect of the new materials is the broad anti-bacterial action spectrum which extends both to gram-positive and also to gram-negative bacteria. At the same time the fact that the salicylamides are odourless and colourless are of particular value from the point of view of use technique. The present invention thus also comprises their use in combatting pests quite generally. It is possible to use them on a very broad basis, especially for protecting organic substrates against attack by destructive and pathogenic (also phytopathogenic) micro-organisms. The new salicylamides are accordingly suitable for use both as preservatives and also as disinfectants for textiles and technical products of all kinds, in plant protection, in agriculture, in veterinary medicine and in cosmetics.

The following may be selected as examples from amongst the technical products which may be preserved with the aid of the salicylamides: textile aids or finishing agents, glues, binders, paints, colour pastes or printing pastes and similar preparations based on organic and inorganic dyestuffs or pigments, also including those which contain casein or other organic compounds as admixtures. Wall and ceiling paints, for example those containing an albuminous colour binder, are also protected against attack by pests by adding the new compounds. It is also possible to use them to protect timber.

Furthermore, the compounds of Formulae 1 to 3 may be used for preservative and disinfectant finishes on fibres and textiles, and may be applied to natural or synthetic fibres and there develop a durable action against harmful (including pathogenic) organisms, for example fungi and bacteria. Herein the addition may take place before, simultaneously with or after a treatment of these textiles with other materials, for example colour pastes, printing pastes finishes and the like.

Textiles which have been treated in this way also show a protection against the occurrence of perspiration odour such as is occasioned by micro-organisms.

The new salicylamides can also be employed as preservatives in the cellulose and paper industry, inter alia for preventing the known slime formation, caused by micro-organisms, in the equipment used for the production of paper.

Furthermore detergents and cleansing agents having an excellent anti-bacterial and/or anti-mycotic action are obtained by combining the compounds of Formula 1 to 3 with detergents and/or surface-active substances. The salicylamides may for example be incorporated into soaps or be combined with soap-free detergents and/or surface-active substances or with mixtures of soaps and soap-free detergent substances; their anti-microbial activity remains fully preserved in these combinations.

Cleansing agents containing a compound of Formula 1 may be employed in industry and in the household, and also in the food industry, for example dairies, breweries or abattoirs. The salicylamides may also be used as a constituent of preparations which serve for cleaning and/or disinfection in hospitals and in medical practice.

The action can also be utilised in preservative and disinfectant finishes of plastics. When using plasticisers it is advantageous to add the salicylamide to the plastic with the salicylamide dissolved or dispersed in the plasticiser. It is appropriate to ensure as uniform distribution in the plastic as possible. The plastics with anti-microbial properties may be used for consumer articles of all kinds in which an activity against the most diverse germs such as for example bacteria and fungi is desired, such as for example in doormats, bathroom curtains, toilet seats, foot grids in swimming baths and wall coverings. Floor polishes and furniture polishes having a distinfectant action are obtained by incorporating the materials into wax and polishing compositions.

The salicylamides of Formula 1 may be applied in the most diverse manner to textile materials which are to be protected, for example by impregnation or spraying with solutions or suspensions which contain the compounds mentioned as the active substance. Herein the active substance content may, depending on the end use, be between 1 and 30 g. of active substance per litre of treatment liquid. In most cases textile materials of both synthetic and natural origin are adequately protected against fungal and bacterial attack by a content of 0.1 to 3% of active substance. The active substance may be employed together with other textile aids such as finishing agents, crease-proof finishes and the like.

The use forms may correspond to the usual formulations of pesticides; for example materials which contain a compound of Formula 1 may optionally also further contain additives such as carriers, solvents, diluents, dispersing agents, wetting agents or adhesives and the like, as well as other pesticides. Finally it is also possible for several compounds of Formulae 1 to 3 to be simultaneously present in such materials for combatting harmful micro-organisms.

The parts specified in the examples which follow are parts by weight and the percentages are percentages by weight unless otherwise stated.

EXAMPLE 1

22.6 parts of 3,5-dichlorosalicylic acid chloride are dissolved in 100 parts by volume of acetone. The solution is cooled to 5° C. and a solution of 19.1 parts of 2-amino-4-cyclohexyl-phenol in a mixture of 100 parts by volume of acetone and 100 parts by volume of dioxane is added at this temperature. 50 parts by volume of 2 N sodium hydroxide solution are added dropwise to the reaction mixture at 5 to 10° C. over the course of 10 minutes and the whole is then poured into ice-water. The compound of formula

(11) 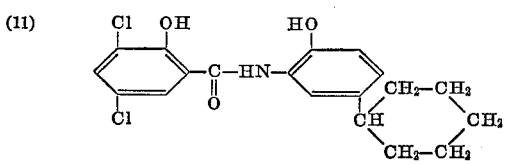

first separates out as a viscous oil, but solidifies after some continued stirring to give a crystalline mass and is then filtered off, washed with water and dried. The yield is approximately 34 parts; melting point 187 to 191° C.

After recrystallisation from chlorobenzene about 23 parts of a pure compound melting at 198.5 to 199.5° C. are produced.

The compounds of Formula 1 listed in the table which follows, wherein X and Y have the significance mentioned, can be manufactured in a similar manner:

| Number: | X | Y | (Position) | Melting Point in °C. |
|---|---|---|---|---|
| 12 | H | $-\overset{\underset{\mid}{CH_3}}{\underset{\mid}{C}}-CH_2-\overset{\underset{\mid}{CH_3}}{\underset{\mid}{C}}-CH_3$ | (5′) | 155–156 |
| 13 | H | $-CH\underset{CH_2-CH_2}{\overset{CH_2-CH_2}{\diagup\diagdown}}CH_2$ | (5′) | 145–146 |
| 14 | H | —C₆H₁₁ (cyclohexyl) | (4′) | 203–204 |
| 15 | H | —C₆H₁₁ (cyclohexyl) | (5′) | 188–189 |
| 16 | H | $-\overset{\underset{\mid}{CH_3}}{\underset{\mid}{C}}-C_6H_{11}$ | (5′) | 122.5–123.5 |
| 17 | H | —CF₃ | (5′) | 191–192 |
| 18 | Cl | —CH₃ | (4′) | 194–195 |
| 19 | Cl | —CH₃ | (5′) | 193–194 |
| 20 | Cl | —C(CH₃)₃ | (5′) | 173–175 |
| 21 | Cl | $-\overset{\underset{\mid}{CH_3}}{\underset{\mid}{C}}-CH_2-\overset{\underset{\mid}{CH_3}}{\underset{\mid}{C}}-CH_3$ | (5′) | 191.5–192.5 |
| 22 | Cl | —C₆H₁₁ (cyclohexyl) | (5′) | 201–202 |
| 23 | Cl | $-\overset{\underset{\mid}{CH_3}}{\underset{\mid}{C}}-C_6H_{11}$ | (5′) | 171.5–172.5 |
| 24 | Cl | —CF₃ | (5′) | 209–210 |
| 25 | Br | —CH₃ | (4′) | 196–197 |
| 26 | Br | —CH₃ | (5′) | 220–221 |
| 27 | Br | —C(CH₃)₃ | (5′) | 183–184 |
| 28 | Br | $-\overset{\underset{\mid}{CH_3}}{\underset{\mid}{C}}-CH_2-\overset{\underset{\mid}{CH_3}}{\underset{\mid}{C}}-CH_3$ | (5′) | 172–173 |
| 29 | Br | $-CH\underset{CH_2-CH_2}{\overset{CH_2-CH_2}{\diagup\diagdown}}CH_2$ | (5′) | 205–206 |
| 30 | Br | —C₆H₁₁ (cyclohexyl) | (5′) | 204–205 |
| 31 | Br | $-\overset{\underset{\mid}{CH_3}}{\underset{\mid}{C}}-C_6H_{11}$ | (5′) | 164–165 |
| 32 | Br | —CF₃ | (5′) | 212–213 |
| 33 | Cl | $-\overset{\underset{\mid}{CH_3}}{\underset{\mid}{C}}-CH_2CH_3$ | (5′) | 158.5–159.5 |

| X | Y | (Position) | Melting Point in °C. |
|---|---|---|---|
| 34 ........ Br | $-\underset{\underset{CH_3}{|}}{\overset{\overset{CH_3}{|}}{C}}-CH_2CH_3$ | (5′) | 170–171 |
| 35 ........ Cl | —CH₃ | (3′) | 191–191.5 |
| 36 ........ Cl | —⟨ ⟩ | (4′) | 218–129 |
| 37 ........ Br | —⟨ ⟩ | (4′) | 235–236 |
| 38 ........ Cl | —(CH₂)₁₁—CH₃ | (5′) | 115–116.5 |

EXAMPLE 2

Determination of the minimal inhibitory concentration (MIC) against bacteria and fungi in the dilution test The determination of the MIC (minimal inhibitory concentration) is carried out according to a test derived from Standard Specifications, which permits an approximation to absolute minimal inhibitory values of an active substance.

A 1% strength solution and an 0.3% strength solution of the active substances in dimethylsulphoxide is introduced into test tubes with sterile Brain Heart Infusion Broth (bacteria) or beer wort solution (fungi) and dilution series with progressive 10-fold dilution are made up with the solutions. By combination of both series the following continuous dilution series is obtained: 1000, 300, 100, 30, 10, 3 p.p.m. and so on.

The solutions are inoculated with the bacterium *Staphylococcus aureus* or the fungi *Aspergillus niger* and *Rhizopus nigricans*. Thereafter the material is, in the case of *Staphylococcus aureus* incubated for 48 hours at 37° C. (bacteriostasis) and, in the case of the fungi, for 72 hours at 30° C. (fungistasis).

The minimal inhibitory values (p.p.m.) shown in the table which follows are obtained after the times mentioned.

TABLE II

| | Inhibitory values (p.p.m.) of— | | |
|---|---|---|---|
| | Bacteriostasis, | Fungistatis | |
| | *Staphylococcus aureus* | *Aspergillus niger* | *Rhizopus nigrican* |
| Compound No.: | | | |
| 11 | 0.3 | | <100 |
| 12 | 1 | | |
| 13 | 1 | | |
| 14 | 3 | | |
| 15 | 10 | | |
| 16 | 3 | | |
| 17 | 100 | 100 | 30 |
| 18 | 10 | | <100 |
| 19 | 3 | | |
| 20 | 1 | 100 | <3 |
| 21 | 0.3 | | |
| 22 | 1 | | <100 |
| 23 | 0.3 | | <100 |
| 24 | 10 | 30 | 30 |
| 25 | 10 | 100 | <3 |
| 26 | 10 | | <100 |
| 27 | 3 | | |
| 28 | 0.3 | | <100 |
| 29 | 0.3 | | <100 |
| 30 | 1 | | <100 |
| 31 | 0.3 | | <100 |
| 32 | 10 | | <100 |
| 33 | 100 | | <190 |
| 34 | 1 | | <100 |
| 35 | 100 | | <100 |
| 36 | 1 | | |
| 37 | 1 | | |

EXAMPLE 3

Determination of the minimal inhibitory concentration (MIC) against bacteria and fungi in the gradient plate test The compounds of Formula 1, in suitable formulations (for example as solutions in dimethylsulphoxide) of a certain concentration, are mixed with warm Brain Heart Infusion Agar (bacteria) and Mycophil Agar (fungi) respectively. The liquid mixtures are cast onto a solidified wedge-shaped base agar layer and are also allowed to solidify.

The test organisms are now applied along a line at right angles to the gradient by means of a Pasteur pipette. After an incubation of 24 hours at 37° C. (bacteria) or 72 hours at 30° C. (fungi) respectively, the length of the germs which have grown on the inoculation line is measured and expressed in p.p.m. of active substance.

TABLE III

| | Minimal Inhibitory Concentration (p.p.m.) of— | | |
|---|---|---|---|
| | *Streptococcus mitis* | *Trichophyton interdigitale* | *Trichophyton mentagraphytes* |
| Compound No. | | | |
| 11 | 0.5 | 1 | 2 |
| 12 | 2 | 10 | 1 |
| 13 | 30 | 0.3 | 0.3 |
| 19 | 1 | 10 | 10 |
| 20 | 10 | 1 | 3 |
| 21 | 0.2 | 2 | 2.5 |
| 22 | 2 | 3 | 3 |
| 25 | 40 | 2 | 2.5 |
| 27 | 0.4 | 2 | 4 |
| 28 | 0.4 | 2 | 3 |
| 29 | 0.5 | 2 | 2 |
| 30 | 0.9 | 2 | 3 |
| 31 | 0.1 | 2 | 4 |
| 37 | 0.5 | 2 | 2.5 |

EXAMPLE 4

In order to manufacture an antimicrobial cake of soap, 1.2 g. of the compound of Formula 28 are added to the following mixture: 120 g. of base soap in the form of flakes 0.12 g. of the disodium salt of ethylene-diamine-tetraacetic acid (dihydrate), and 0.24 g. of titanium dioxide.

The soap chips obtained by rolling are powdered by means of a rapid-running stirrer and subsequently pressed into cakes of soap.

A 5% strength solution and a 1.5% strength solution in sterile tapwater are manufactured with the antimicrobial soap. 1 ml. of these solutions is added to, in each case, 4 ml. of sterile Brain Heart Infusion Broth. By progressive 10-fold dilution in each case, two series are obtained which on combination yield the following continuous dilution series: 100, 30, 10, 1 . . . p.p.m. of active substance.

The solutions are inoculated with a bacteria *Staphylococcus aureus* or *Escherichia coli* and incubated for 24 hours at 37° C. After this time 0.05 ml. are withdrawn from the solutions by means of a pipette and allowed to run over inclined Brain Heart Infusion Agar. Solutions (bacteriostasis) as well as agar test tubes (bactericidal effect) are then incubated for a further 24 hours at 37° C.

The minimal inhibitory concentration and minimal lethal concentration (p.p.m.), respectively, are determined for the solutions and the inclined agar test tubes:

TABLE IV

| | Action against | |
|---|---|---|
| | *Staphylococcus aureus*, p.p.m. | *Escherichia coil* |
| Bacteriostasis [48 hours] | <0.1 | 100 |
| Bactericidal effect [24 hours] | <0.1 | 100 |

EXAMPLE 5

The following mixture is rolled for 20 minutes at 150° C. on a two-roll mill: 100.00 parts of polyvinyl chloride, 45.25 parts of di-2-ethylhexylphthalate, 1.5 parts of barium/cadmium laurate, 0.25 part of stearic acid and 7.75 parts of a solution of 1.55 parts of Formula 37 in 6.25 parts of di-2-ethylhexyl phthalate. The roll nip is so adjusted that 1 mm. thick hides are produced which are subsequently pressed for 80 minutes at 165 to 170° C. at 1400 kg./cm.²

In order to test the action against bacteria, 10 mm. diameter discs are punched out of the plasticized polyvinyl chloride and laid on Brain Heart Infusion Agar plates which have been pre-inoculated with *Staphylococcus aureus*. The plates are thereafter incubated for 24 hours at 37° C.

The items assessed are, on the one hand, the inhibitory zone which manifests itself around the discs (HZ in mm.) and, on the other hand, the microscopically determinable growth (W in percent) underneath and on the plasticised polyvinyl chloride:

TABLE V

Without soaking:
  HZ in mm. ------------------------------ 3
  W in percent --------------------------- 0
Soaked [1]:
  HZ in mm. ------------------------------ 3
  W in percent --------------------------- 0

[1] Soaking : 24 hours at 30° C.

EXAMPLE 6

Samplse of 100 g. cotton cretonne are impregnated with a 1% strength solution of Compound No. 21 in isopropanol at 20° C. on a padding machine and subsequently squeezed out to leave 100% liquor uptake.

Samples of 100 g. wool cheviot are also treated in the same manner.

The fabrics dried at 30 to 40° C. contain 1% of active substance relative to their own weight.

In order to test the action against bacteria, 10 mm. diameter discs of the impregnated fabrics are, unsoaked and after soaking, laid for 24 hours at 29° C. onto Brain Heart Infusion Agar plates which are pre-inoculated with *Staphylococcus aureus*. The plates are thereafter incubated for 24 hours at 37° C.

The items assessed are, on the one hand, the inhibitory zone which arises around the discs (HZ in mm.) and, on the other hand, the microscopically determinable growth (W in percent) under and on the fabric:

| Substrate (with 1% active substance) | Without soaking | | Soaked | |
|---|---|---|---|---|
| | HZ in mm. | W in percent | HZ in mm. | W in percent |
| Cotton | 7 | 0 | 4 | 0 |
| Wool | 5 | 0 | 4 | 0 |

We claim:
1. A salicylic acid o-hydroxyphenylamide corresponding to the formula wherein $X_1$ denotes a member selected from the group consisting of chlorine and bromine and $Y_1$ denotes a member selected from the group consisting of a trifluoromethyl group, an alkyl group having at most 12 carbon atoms, cyclohexyl, phenyl, benzyl and 1,1-dimethyl-1-phenylmethyl.

2. A salicylic acid o-hydroxyphenylamide according to claim 1 and according to the formula wherein $X_1$ denotes a member selected from the group consisting of chlorine and bromine and $Y_1$ has the significance given in claim 1.

3. A salicylic acid o-hydroxyphenylamide of the formula wherein X denotes a member selected from the group consisting of chlorine and bromine.

4. A salicylic acid o-hydroxyphenylamide of the formula wherein X denotes a member selected from the group consisting of chlorine and bromine.

5. A salicylic acid o-hydroxyphenylamide of the formula wherein X denotes a member selected from the group consisting of chlorine or bromine.

6. A salicylic acid o-hydroxyphenylamide of the formula wherein X denotes a member selected from the group consisting of chlorine and bromine.

References Cited

UNITED STATES PATENTS 2,486,538  11/1949  Thompson ---------- 252—403

HENRY R. JILES, Primary Examiner

H. I. MOATZ, Assistant Examiner

U.S. Cl. X.R.

8—133; 252—403; 260—45.9; 424—324

CASE 6235/E

PO-1050
(5/69)

UNITED STATES PATENT OFFICE
CERTIFICATE OF CORRECTION

Patent No. 3,576,869              Dated  April 27, 1971

Inventor(s) MAX SCHELLENBAUM ET AL

It is certified that error appears in the above-identified patent and that said Letters Patent are hereby corrected as shown below:

Column 7, lines 52-59, amend the right hand side of the formu: to read:

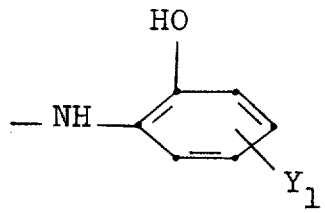

Column 8, line 2, delete "according" and insert --- correspon( ing ---.

Signed and sealed this 4th day of January 1972

(SEAL)
Attest:

EDWARD M. FLETCHER, JR.
Attesting Officer

ROBERT GOTTSCHALK
Acting Commissioner of Patent